US011614558B2

(12) United States Patent
Kiselev et al.

(10) Patent No.: US 11,614,558 B2
(45) Date of Patent: Mar. 28, 2023

(54) LOOK AHEAD INFORMATION FOR A GEO-STEERING SYSTEM

(71) Applicant: Halliburton Energy Services, Inc., Houston, TX (US)

(72) Inventors: Vladimir Yuryevich Kiselev, Houston, OK (US); Vytautas Usaitis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/071,111

(22) Filed: Oct. 15, 2020

(65) Prior Publication Data

US 2022/0120930 A1 Apr. 21, 2022

(51) Int. Cl.
*G01V 3/30* (2006.01)
*G01V 3/34* (2006.01)
*E21B 49/00* (2006.01)

(52) U.S. Cl.
CPC .............. *G01V 3/30* (2013.01); *E21B 49/00* (2013.01); *G01V 3/34* (2013.01)

(58) Field of Classification Search
CPC ............. G01V 3/30; G01V 3/34; E21B 49/00
See application file for complete search history.

(56) References Cited

U.S. PATENT DOCUMENTS

| | | | |
|---|---|---|---|
| 6,211,678 B1 * | 4/2001 | Hagiwara | G01V 3/30 324/338 |
| 7,265,713 B2 * | 9/2007 | Lewis | H01Q 21/0087 342/372 |
| 9,239,403 B2 * | 1/2016 | Bittar | G01V 3/30 |
| 2010/0122847 A1 | 5/2010 | Xia et al. | |
| 2013/0110486 A1 | 5/2013 | Polyakov et al. | |
| 2013/0141102 A1 * | 6/2013 | Donderici | G01V 3/30 324/338 |
| 2013/0226461 A1 * | 8/2013 | Yu | E21B 47/00 702/9 |
| 2015/0160367 A1 | 6/2015 | Le et al. | |
| 2016/0003973 A1 | 1/2016 | Guner et al. | |
| 2016/0032717 A1 * | 2/2016 | Parker | E21B 47/01 367/7 |
| 2016/0178787 A1 * | 6/2016 | Le | G01V 3/28 702/7 |
| 2016/0195633 A1 | 7/2016 | Donderici et al. | |
| 2018/0347353 A1 * | 12/2018 | Wang | G01V 3/18 |

* cited by examiner

*Primary Examiner* — Alexander Satanovsky
*Assistant Examiner* — Lynda Dinh
(74) *Attorney, Agent, or Firm* — Benjamin Ford; Parker Justiss, P.C.

(57) ABSTRACT

The disclosure presents processes to generate look ahead data to guide borehole operations, such as drilling operations. The processes can array collected resistivity data around a representation of an active borehole. The array can be in various patterns, such as an interleaved helix pattern. Each slice of data from the collected resistivity data can be positioned and oriented corresponding to the central point depth parameter for each slice of data. A selection of one or more card views can be enabled to display details of the collected resistivity data corresponding to the selected slice of data. An analysis of the resistivity data can generate an identification of a boundary, such as an object or a subterranean formation change, in the subterranean formation look ahead portion of the active borehole. The boundary identification can be used as inputs to a borehole operation plan or to a geo-steering system.

20 Claims, 8 Drawing Sheets

LOOK AHEAD INFORMATION FOR A GEO-STEERING SYSTEM

TECHNICAL FIELD

This application is directed, in general, to using resistivity data collected in a borehole and, more specifically, to providing look ahead information to a geo-steering system.

BACKGROUND

When developing and drilling boreholes, it is important to be able to position an active borehole where desired proximate the surrounding geology of the subterranean formation and proximate adjacent objects or boreholes. As drilling operations progress, the borehole position can change over time relative to adjacent boreholes, objects, or subterranean formations. In some aspects, the marked positions of adjacent boreholes may be inaccurate or missing. Being able to accurately position an active borehole proximate an adjacent borehole, object, or subterranean formation can reduce the uncertainty of relative positioning of the active borehole, which can improve well planning and active borehole positioning.

SUMMARY

In one aspect, a method is disclosed. In one embodiment the method includes (1) collecting resistivity data from a resistivity tool located downhole of a borehole located at a well site, where the resistivity tool is directed by a borehole system, (2) arraying, around a representation of the borehole, a set of slices of data utilizing a non-overlapping pattern, where each slice of data in the set of slices of data is generated from the resistivity data, (3) aligning each slice of data in the set of slices of data corresponding to a central point depth of each respective slice of data, (4) selecting one or more slices of data from the set of slices of data, and (5) analyzing the resistivity data corresponding to each slice in the one or more slices of data in conjunction with the set of slices of data to identify a boundary to generate an analyzation output.

In a second aspect, a system is disclosed. In one embodiment, the system includes (1) a resistivity tool, capable to collect resistivity data, wherein the resistivity tool is located downhole a borehole of a well site, and (2) a resistivity localizer, capable of receiving the resistivity data, parsing the resistivity data into slices of data, and arraying the slices of data around a representation of the borehole where each slice is non-overlapping, producing one or more card views.

In third aspect, a computer program product having a series of operating instructions stored on a non-transitory computer-readable medium that directs a data processing apparatus when executed thereby to perform operations to determine look ahead inversion mapping from resistivity data is disclosed. In one embodiment the operations include (1) receiving the resistivity data from a resistivity tool located downhole of a borehole located at a well site, where the resistivity tool is directed by a borehole system, (2) arraying, around a representation of the borehole, a set of slices of data utilizing a non-overlapping pattern, where each slice of data in the set of slices of data is generated from the resistivity data, (3) aligning each slice of data in the set of slices of data corresponding to a central point depth of each respective slice of data, (4) selecting one or more slices of data from the set of slices of data, and (5) analyzing the resistivity data corresponding to each slice in the one or more slices of data in conjunction with the set of slices of data to identify a boundary to generate an analyzation output.

BRIEF DESCRIPTION

Reference is now made to the following descriptions taken in conjunction with the accompanying drawings, in which.

DETAILED DESCRIPTION

In borehole system development, users, such as well operators or engineers, use geo-steering techniques to maintain borehole development, e.g., drilling operations, along an intended path and direction. Knowing the position of the borehole relative to nearby, e.g., adjacent or proximate, boreholes, e.g., objects, or subterranean formation changes can be beneficial to ensure borehole separation or to ensure borehole intercept at the desired location. Adjacent boreholes can be active or abandoned, and the borehole positioning data of the adjacent borehole can be accurate, inaccurate, or missing, such as a borehole drilled by another operator. The borehole development can be for various uses, for example, hydrocarbon production, geothermal uses, scientific uses, mining uses, and other uses of boreholes.

Hydrocarbon borehole operators would prefer access to a large quantity of information regarding the parameters and conditions encountered downhole. Such information typically includes characteristics of the subterranean formations traversed by the borehole and data relating to the size and configuration of the borehole. The collection of information relating to conditions downhole, which commonly is referred to as logging, can be performed using various tools, for example, wireline logging and logging while drilling (LWD).

In wireline logging, a probe, e.g., a sonde, can be lowered into the borehole after drilling has taken place. The sonde can hang at the end of a long cable, e.g., the wireline, to provide mechanical support to the sonde, and to provide an electrical connection between the sonde and electrical equipment located at or near the surface of the borehole. In accordance with existing logging techniques, various parameters of the subterranean formations can be measured and correlated with the position of the sonde in the borehole as the sonde is lowered or raised within the borehole.

In LWD, the drilling assembly can include sensing instruments that measure various parameters as the formation is being drilled, thereby enabling measurements of the subterranean formation while it is less affected by fluid invasion. While LWD measurements are desirable, drilling operations create an environment that can negatively affect electronic instrumentation, telemetry, and sensor operations.

Various measurement tools exist for use in wireline logging and LWD applications. One such tool is the resistivity tool, which includes one or more antennas for transmitting an electromagnetic signal into the formation and one or more antennas for receiving a formation response. When operated at low frequencies, the resistivity tool can be referred to as an induction tool, and at high frequencies it can be referred to as an electromagnetic wave propagation tool. The physical phenomena that dominate the measurement can vary with the selected frequency, while the operating principles for the tool can be consistent. In some aspects, the amplitude or the phase of the received signals can be compared to the respective amplitude or phase of the transmitted signals to measure the subterranean formation resistivity. In other aspects, the amplitude or phase of the received signals can be compared to each other to measure the subterranean formation resistivity.

In these and other logging environments, measured parameters can be recorded and, in some aspects, displayed in the form of a log, for example, a two-dimensional graph showing the measured parameter as a function of tool position or depth. For example, when plotted as a function of depth or tool position in the borehole, the resistivity tool measurements can be termed resistivity logs. Resistivity logs can be displayed as modeled inversion slices aligned with a depth of the borehole position. The inversion slices can be aligned with the vertical axis.

This form of display can be more applicable for horizontal wells with two-dimensional (2D) resistivity inversion along the borehole. Applying the existing form of display the resistivity inversion can become a challenge for the look ahead inversion slices for a vertical or nearly vertical borehole, e.g., vertically oriented borehole. There can be uncertainty of the data to display in the look ahead area, e.g., an area in front of a developing borehole, such as in front of the drill bit. Reducing the uncertainty of the look ahead area would be beneficial.

In some aspects, vertically oriented boreholes can be typically, for example, oriented approximately 0.0 to 30.0 degrees from a vertical orientation. In some aspects other angles, including a 90.0 degree horizontal angle, can be utilized. In comparison to horizontal or near horizontal boreholes, vertically oriented boreholes can present increased, difficultly in producing resistivity inversion data in a vertical depth scale. In some aspects, the look ahead inversion can have an increased uncertainty for a predicted boundary. In these aspects, reducing the uncertainty to improve estimated distances to a boundary and the uncertainty correspondence to that boundary would be beneficial.

Computing systems used for this analysis can be one or more various computing systems that can receive resistivity data collected from a downhole location, for example, a downhole tool controller, a well site controller, a resistivity controller, a resistivity localizer, a remote computing system, a data center, a cloud service, a PDA, a laptop, a mobile phone, a smartphone, a desktop, a server, or other types of computing systems.

In some aspects, this disclosure presents processes to stack vertical slices of data from resistivity tools side by side. Slices of data represent one measurement as collected by a resistivity tool. The number of slices of data portioned around a diameter of the resistivity tool is typically configurable, for example, some aspects can utilize 200 pixels of data to complete one revolution around the resistivity tool.

The length of a slice of data corresponds to the type of resistivity tool being used, the spacing of the resistivity transmitter and receivers, the power being transmitted, the frequency being transmitted, the subterranean formation characteristics, and other factors. In some aspects, the slices of data can be aligned by a total vertical depth parameter or a measured depth parameter. In some aspects, one or more of the slices can be selected to display one or more views of the detailed resistivity data for the selected slice, e.g., card views. In some aspects, the card views can be displayed side by side by themselves or next to the display of the side by side slices of data.

The disclosed data analysis processes can allow geo-steering software to be able to geo-steer borehole development more accurately by providing a method of visualization and interpretation for the slices of data from the resistivity tools. The processes can improve understanding of the resistivity field around and ahead of the borehole, providing a method to display uncertainty for a boundary, comparing the distribution type (D) resistivity curves from various vertical depths to analyze the uncertainty for a boundary, and to display the depth indicator for slices of data that can be included in the inversion calculation.

Improvements can be made in various areas to aid the user or computing system in analyzing and interpreting the resistivity data. In some aspects, a resistivity inversion display can be utilized for look ahead data, improving the ability to estimate what lies ahead of a drilling borehole. In some aspects, an ability to analyze and interpret the resistivity inversion data on a vertical track can be utilized, improving the look ahead for vertical oriented boreholes. In some aspects, an ability to analyze uncertainty of the boundary can be utilized, reducing the uncertainty ellipses. In some aspects, an ability to display slices of data that are included in inversion calculations can be utilized to increase the reliability of the generated results.

In some aspects, geo-steering systems can more quickly analyze the look ahead resistivity inversion to produce a more accurate geo-steering decision as compared to conventional methods. Geo-steering systems can be a geo-steering system as part of downhole tools, a drill bit controller, a well site controller, a computing system, or other well site or drill string equipment capable of directing operations of downhole tools located in or near the active borehole. In some aspects, the service quality can be improved by minimizing the uncertainty for a predicted boundary by utilizing the visualization of data. In some aspects, geo-steering systems can analyze real-time, near real-time, and stored (e.g., a memory, hard disk, solid state disk, database, or other data storage system) resistivity data faster than conventional methods and generate an interpretation of a complex geology scenario, e.g., a subterranean formation.

Figure 1:
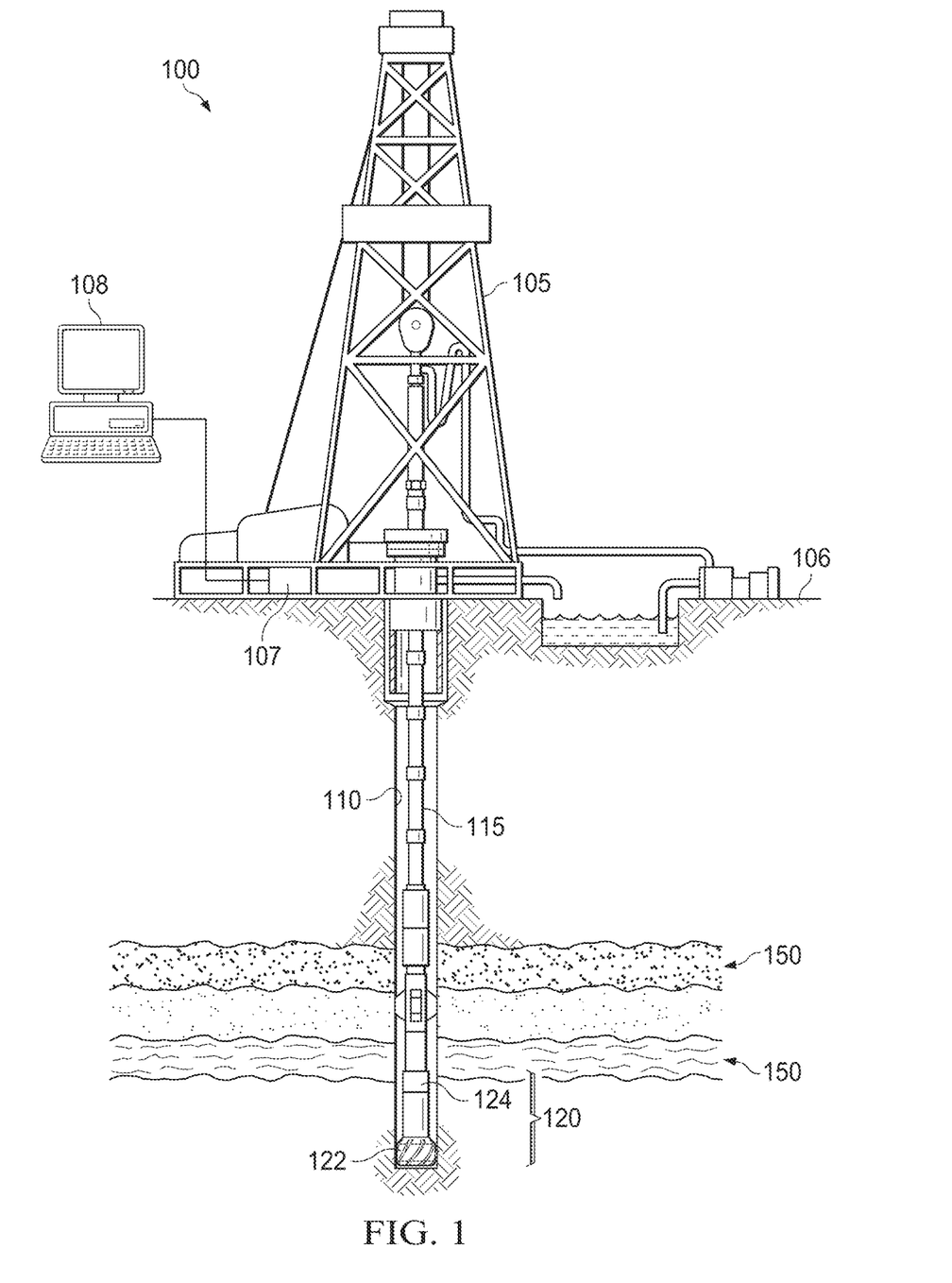
FIG. 1 is an illustration of a diagram of an example drilling system.

Turning now to the figures, FIG. 1 is an illustration of a diagram of an example drilling system 100, for example, a LWD system, a measuring while drilling (MWD) system, a seismic while drilling (SWD) system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is located at a surface 106.

Extending below derrick 105 is a borehole 110 with downhole tools 120 at the end of a drill string 115. Downhole tools 120 can include various downhole tools, such as a formation tester or a bottom hole assembly (BHA). At the bottom of downhole tools 120 is a drilling bit 122. Other components of downhole tools 120 can be present, such as a local power supply (e.g., generators, batteries, or capacitors), telemetry systems, sensors, transceivers, and control systems. Downhole tools 120 includes one or more resistivity tools 124 along with a resistivity tool controller. A resistivity localizer can be present as part of resistivity tools 124, resistivity tools controller, well site controller 107, or computing system 108. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107.

Well site controller 107 or computing system 108 can communicate with downhole tools 120 using conventional means, now known or later developed, to direct operations of downhole tools 120. The processes described herein can be performed by one or more of the described systems, such as resistivity tools 124, other downhole tools, well site controller 107, or computing system 108. In some aspects, well site controller 107 or computing system 108 can communicate data and instructions to resistivity tools 124. In some aspects, well site controller 107 or computing system 108 can receive data transmitted from resistivity tools 124 or other downhole tools. In some aspects, computing system 108 can be located with downhole tools 120 and the processes can be completed at the downhole location. The results can be communicated to a drilling system or to a drilling operation system downhole or at a surface location, such as a geo-steering system or to a user system, such as a display or monitor.

Resistivity tools 124 can be directed to collect resistivity data from the surrounding subterranean formation 150. The collected resistivity data can be further processed by a downhole tool or be communicated to well site controller 107 or computing system 108 for further processing. The further processing can include arraying the slices of resistivity data to avoid overlapping of the slices of data, aligning the slices of data to a corresponding depth parameter, and reconstructing the resistivity data by applying a look ahead inversion algorithm to the data.

Figure 2:
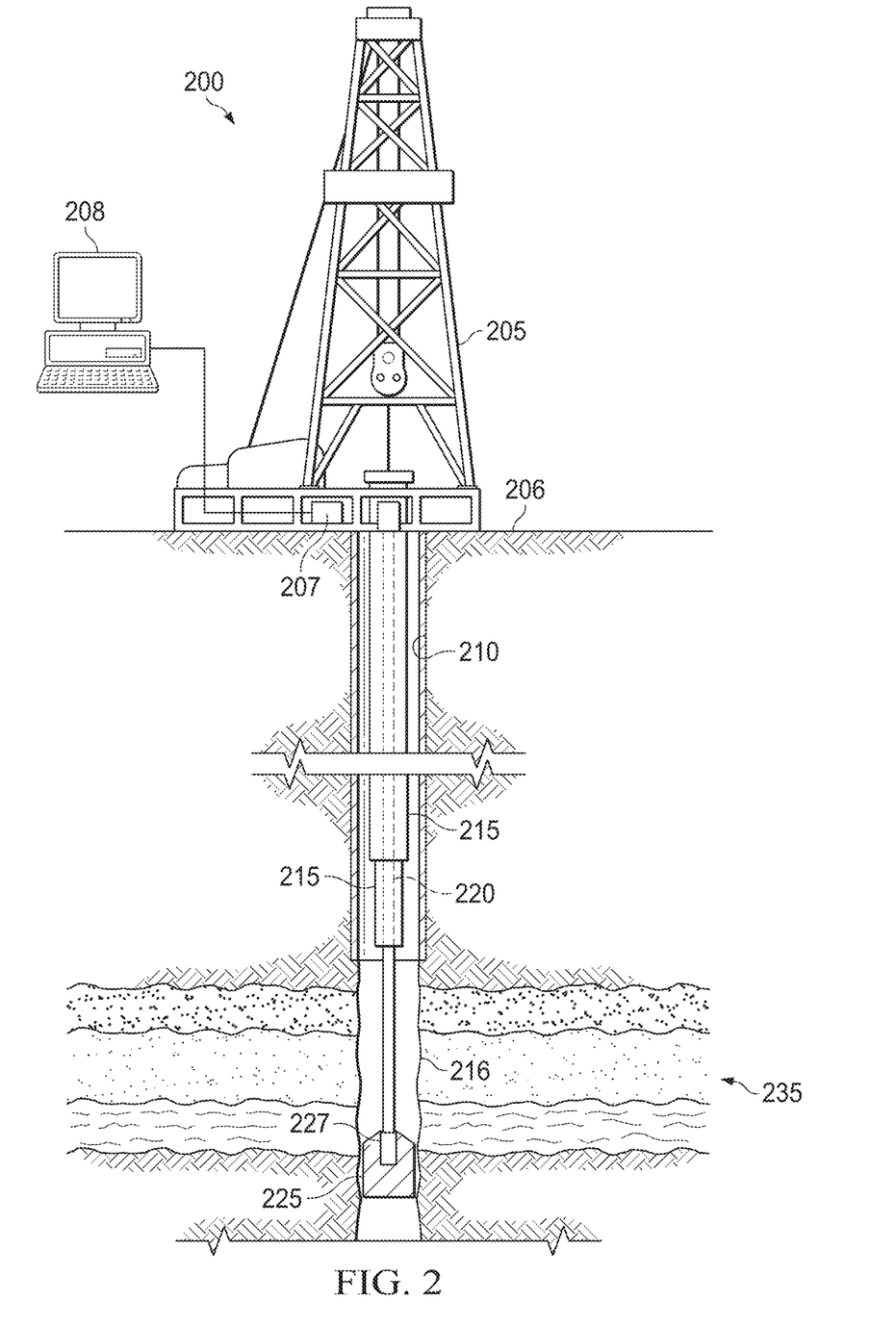
FIG. 2 is an illustration of a diagram of an example wireline system.

FIG. 2 is an illustration of a diagram of an example wireline system 200. Wireline system 200 depicts a wireline well system and includes a derrick 205, a well site controller 207, and a computing system 208. Well site controller 207 includes a processor and a memory and is operable to direct operation of wireline system 200. Derrick 205 is located at a surface 206.

Extending below derrick 205 is a borehole 210, with two cased sections 215 and one uncased section 216. Wireline 220 is inserted in borehole 210 to hold a downhole tool 225. Borehole 210 is surrounded by a subterranean formation 235 which includes a hydrocarbon reservoir.

Downhole tool 225 can include various downhole tools, such as one or more resistivity tools 227. Other components of downhole tool 225 can be present, such as a local energy supply, or batteries and capacitors to store energy received from another system, as well as a transceiver and a control system.

Resistivity tools 227 can collect resistivity data and transmit the data uphole. A resistivity localizer, well site controller 207, or computing system 208 can utilize the received data to generate a look ahead inversion map of the look ahead area of a portion of subterranean formation 235.

Computing system 208 or well site controller 207 can be utilized to perform the operations of the resistivity localizer in part or in whole. Computing system 208 can be proximate well site controller 207 or be a distance away, such as in a cloud environment, a data center, a lab, or a corporate office. Computing system 208 can be a laptop, smartphone, PDA, server, desktop computer, cloud computing system, and other computing systems that are operable to perform the process and methods described herein. The information and results generated from computing system 208 can be communicated by various conventional means to well site controller 207 and to well site operators and engineers so the received data can be used in modifying a well operation plan of wireline system 200.

Figure 3:
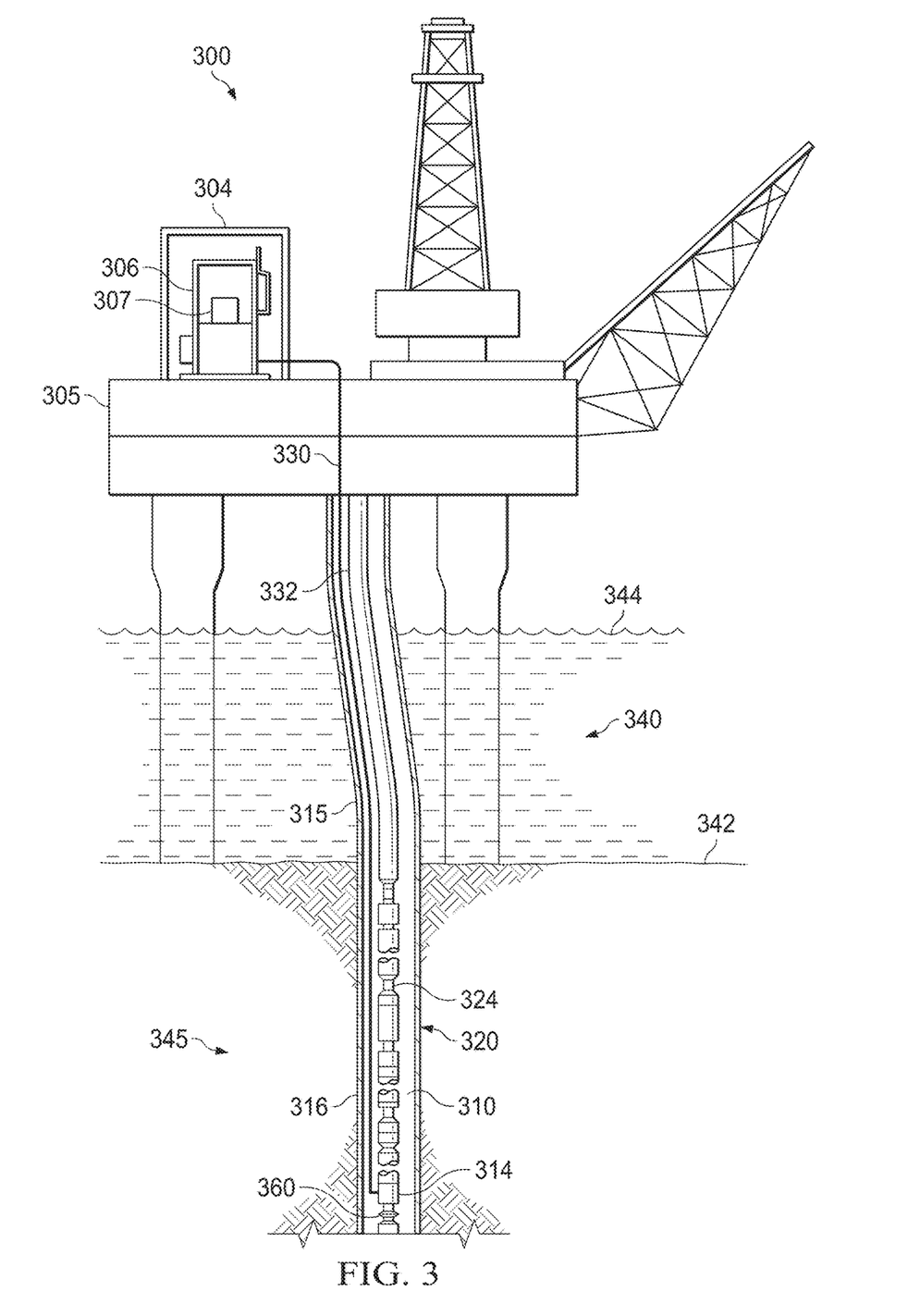
FIG. 3 is an illustration of a diagram of an example offshore system.

FIG. 3 is an illustration of a diagram of an example offshore system 300 with an electric submersible pump (ESP) assembly 320. ESP assembly 320 is placed downhole in a borehole 310 below a body of water 340, such as an ocean or sea. Borehole 310, protected by casing, screens, or other structures, is surrounded by subterranean formation 345. ESP assembly 320 can be used for onshore operations. ESP assembly 320 includes a well controller 307 (for example, to act as a speed and communications controller of ESP assembly 320), an ESP motor 314, and an ESP pump 324.

Well controller 307 is placed in a cabinet 306 inside a control room 304 on an offshore platform 305, such as an oil rig, above water surface 344. Well controller 307 is configured to adjust the operations of ESP motor 314 to improve well productivity. In the illustrated aspect, ESP motor 314 is a two-pole, three-phase squirrel cage induction motor that operates to turn ESP pump 324. ESP motor 314 is located near the bottom of ESP assembly 320, just above downhole sensors within borehole 310. A power/communication cable 330 extends from well controller 307 to ESP motor 314. A fluid pipe 332 fluidly couples equipment located on offshore platform 305 and ESP pump 324.

In some aspects, ESP pump 324 can be a horizontal surface pump, a progressive cavity pump, a subsurface compressor system, or an electric submersible progressive cavity pump. A motor seal section and intake section may extend between ESP motor 314 and ESP pump 324. A riser 315 separates ESP assembly 320 from water 340 until sub-surface 342 is encountered, and a casing 316 can separate borehole 310 from subterranean formation 345 at and below sub-surface 342. Perforations in casing 316 can allow the fluid of interest from subterranean formation 345 to enter borehole 310.

Offshore system 300 is demonstrating an example where a resistivity tool 360 is located downhole, as part of ESP assembly 320. Resistivity tool 360 can transmit data to a resistivity localizer located on offshore platform 305. The received data can be communicated to well controller 307, to a user a device, or to another system.

FIGS. 1 and 2 depict onshore operations. Those skilled in the art will understand that the disclosure is equally well suited for use in offshore operations. FIGS. 1, 2, and 3 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 4:
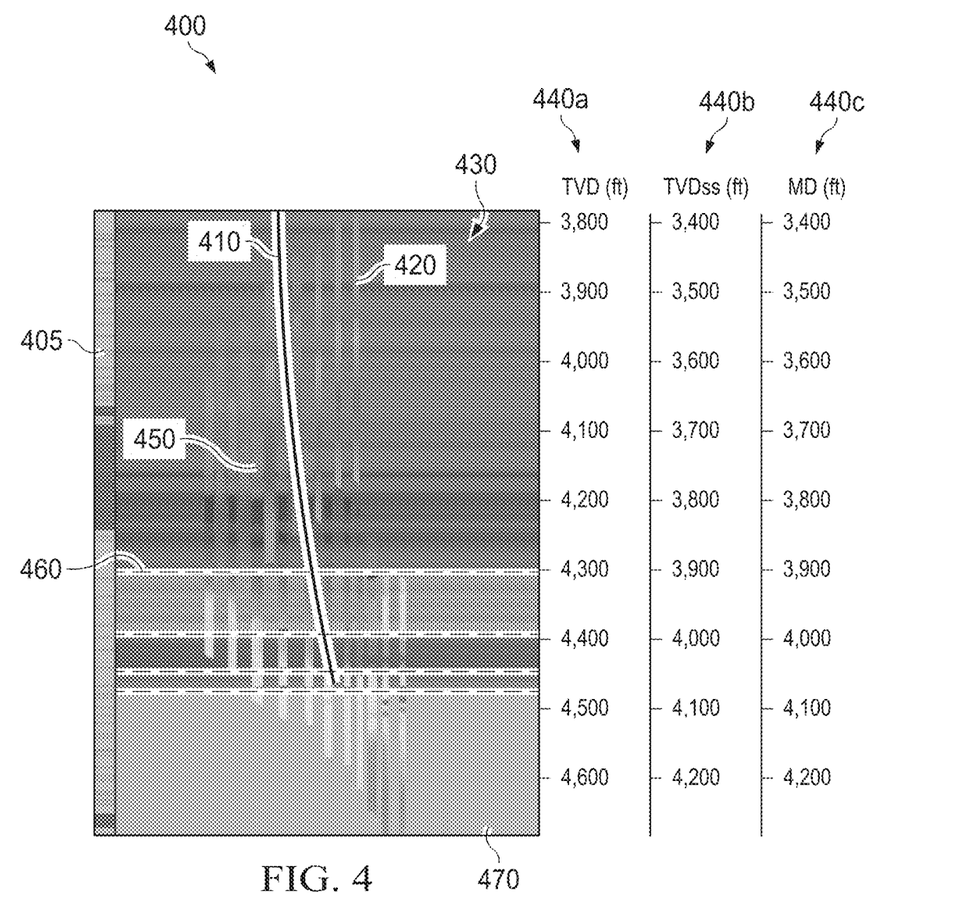
FIG. 4 is an illustration of a diagram of an example look ahead display.

FIG. 4 is an illustration of a diagram of an example look ahead display 400, such as a visual display that can be utilized by a user in determining surrounding and look ahead objects or subterranean formations around and ahead of an active borehole. Look ahead display 400 is a visual representation of the processes described herein. In some aspects, the processes can be implemented in a computing system with or without the visual component. Look ahead display 400 has a vertical color bar 405 indicating the comparative low to high resistivity values. Color bar 405 can display the inversion misfit data according to the slice's respective depth parameter.

A borehole path 410, represented by the dark solid line, is shown using a true vertical depth scale and is oriented roughly vertical. Vertical inversion slices 420 are arranged around borehole path 410 corresponding to either a measured depth parameter or a true vertical depth parameter of the resistivity transmitter or receiver position along borehole path 410, where the respective depth parameter corresponds to the central point of each respective slice. Each slice can have a height above and below its central point according to the calculated depth of the inversion, where the height above and height below (overall length of the slice) can depend on the resistivity tool characteristics and subterranean formation characteristics. In some aspects, the slices can be arranged in a descending helix pattern, where an upper portion of a lower slice can be interleaved with bottom portions of upper slices, where upper and lower comparisons utilize the respective central point depth parameter.

A subterranean formation image 430 is shown with respective resistivity properties according to the collected resistivity data. A true vertical depth axis 440a is shown in feet. A true vertical depth sub-sea axis 440b is shown in feet. A measured depth axis 440c is shown in feet. One or more of these axes can be utilized by the processes disclosed herein. An overlap between two interleaved inversion slices is shown by position 450. A boundary 460 is shown as a dotted dark line. Boundary 460 can be imported from a known data source or generated from the collected resistivity data, e.g., boundary data. Blank area 470 represents the look ahead portion such as in front of an active drill bit. The disclosed process herein can provide inversion analysis to fill in blank area 470 with subterranean formation features and boundaries thereby providing a look ahead analysis for a user or computing system to use to adjust drilling operations.

In some aspects, the processes can utilize smart filtering or a machine learning algorithm to generate a look ahead inversion. A smart filtering or machine learning algorithm can enhance the quality of the slices of data. The slices, as presented in look ahead display 400, can be utilized to define a calculation window, where selected slices of data overlap at a calculation depth parameter. The calculation depth parameter can be a reference depth interval to recalculate and enhance inversion results utilizing data from near measured points, such as at a specified true vertical depth, a specified true vertical depth sub-sea, or a specified measured depth. In some aspects, slices of data that do not overlap at the calculation depth parameter, are not included in the inversion calculation. In some aspects, a percentage of overlap parameter can be utilized to further reduce the number of slices of data used in the inversion calculation. For example, slices of data that overlap by at least 50.0% can be included in the inversion calculation, where other percentages can be utilized.

Figure 5:
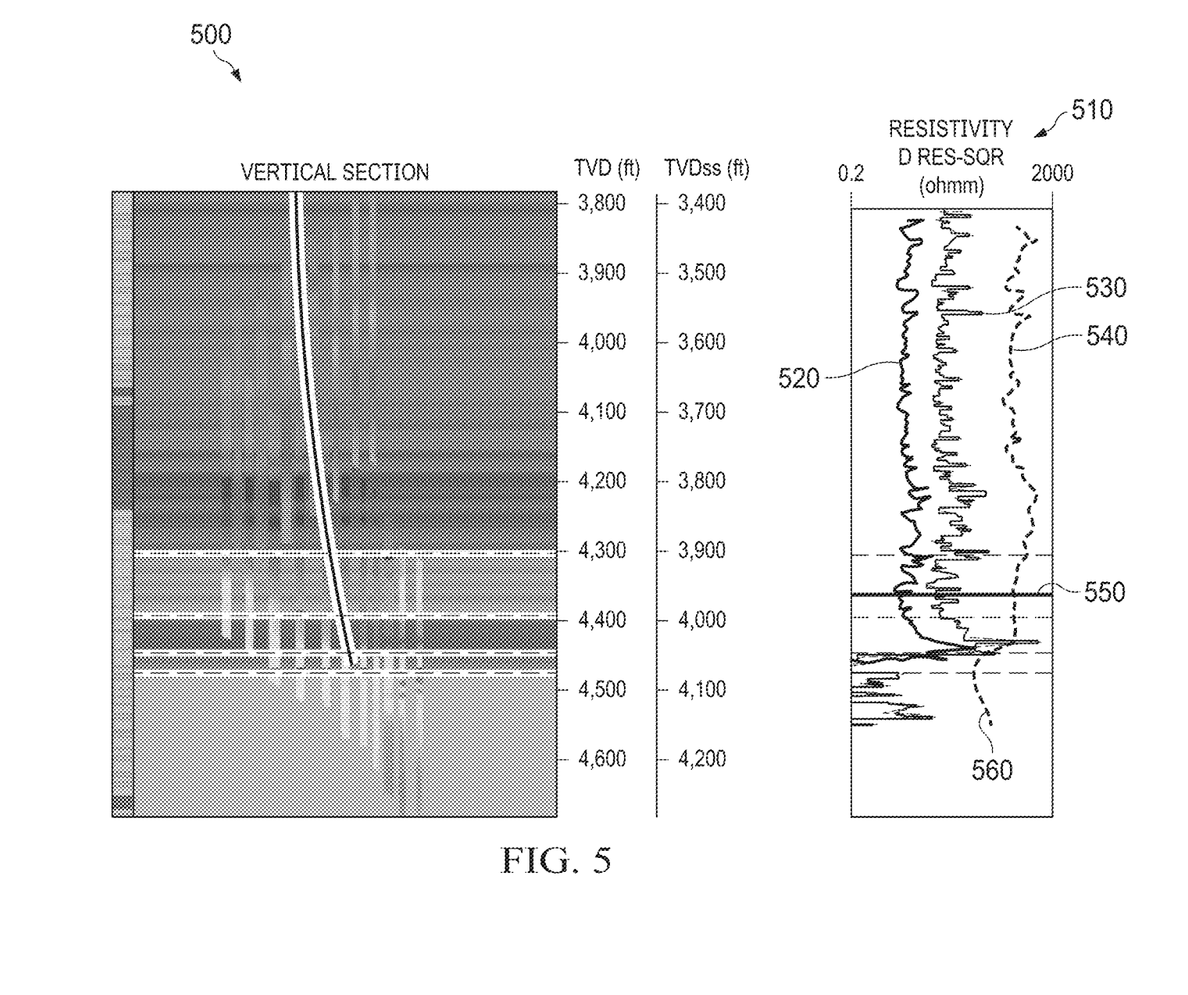
FIG. 5 is an illustration of a diagram of an example resistivity plot.

FIG. 5 is an illustration of a diagram of an example resistivity plot 500 that builds on look ahead display 400. A vertical track can be utilized as additional information to analyze and correlate collected resistivity data and offset data from offset boreholes. A selected depth parameter can be used to generate a vertical track 510. A line plot 520 demonstrates an average resistivity log from the resistivity tool. A line plot 530 demonstrates an offset resistivity pseudo log from an offset borehole. In some aspects, a portion of the subterranean formation image can be generated using the resistivity pseudo log.

A line plot 540 demonstrates a resistivity log generated from resistivity data using the distribution resistivity curve with a calculated resistivity deeper than the borehole true vertical depth position. The distribution resistivity curve can utilize various distribution percentages, for example, D5%, D10%, D15%, D95%, or other percentage values. A marker line 550 indicates the borehole position corresponding to the resistivity transmitter depth parameter. A line plot 560 is a continuation of line plot 540 below the depth of the end of the borehole as indicated by marker line 550. Line plot 560 is a calculated distribution resistivity curve below the borehole true vertical depth position and can be utilized to estimate look ahead data to build an inversion map or to guide a geo-steering tool.

Figure 6A:
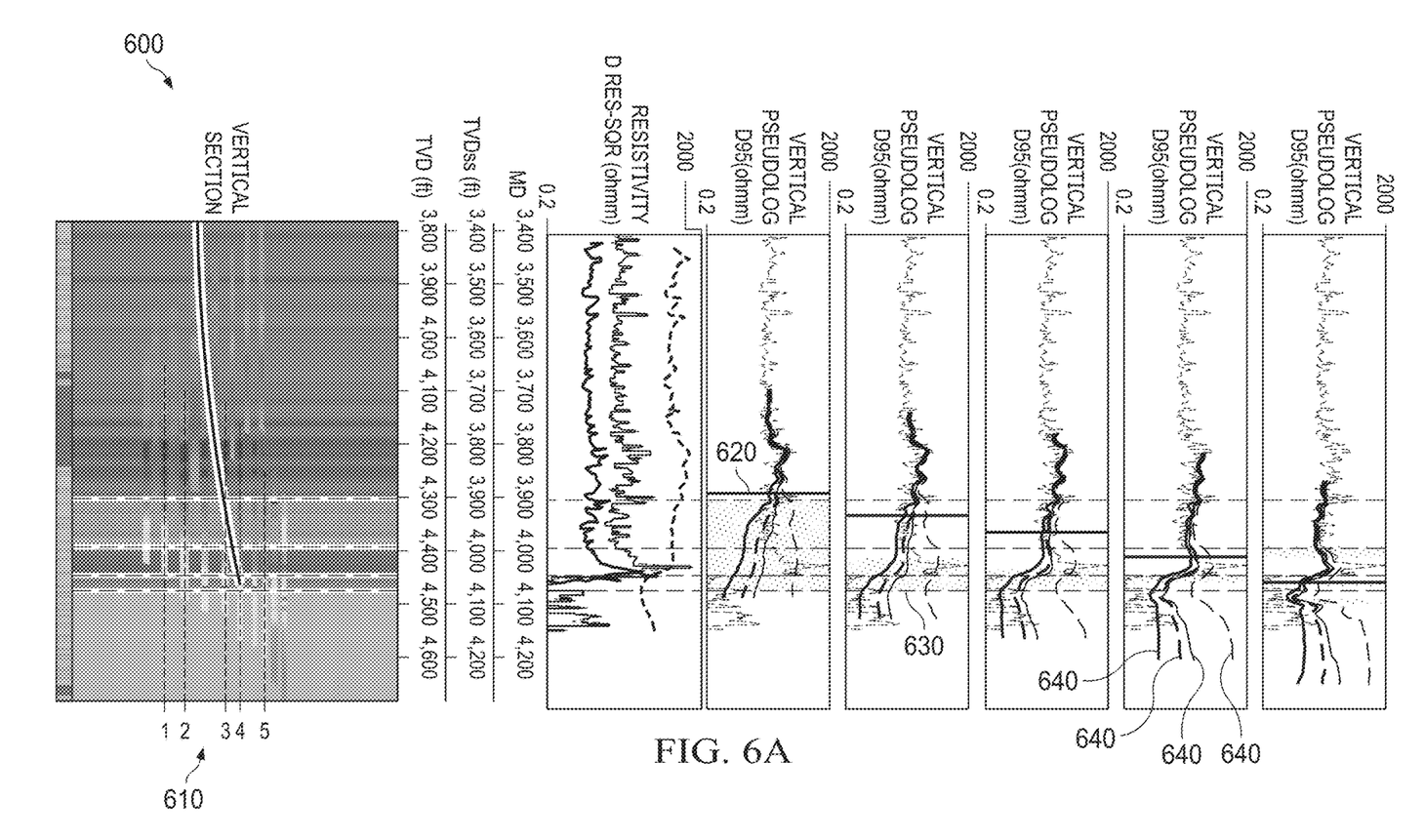
FIG. 6A is an illustration of a diagram of an example five card view.

FIG. 6A is an illustration of a diagram of an example five card view 600, building on resistivity plot 500. Five card view 600 can be utilized as additional information to analyze the look ahead resistivity data. In some aspects, five card view 600 can allow a user to select a slice of data from the inversion plot to display the distribution resistivity curves for a particular slice as one card, e.g., vertical display. Five card view 600 is an example for demonstrate purposes as in other aspects, fewer or greater number of card views can be utilized with the described processes herein.

The user or computing system can analyze the inversion results across the selected card views in five card view 600 as drilling progresses to improve accuracy of identifying predicted boundaries, such as utilizing resistivity contrast.

A vertical line-indicator 610 demonstrates an indicator of the slices of data that have been selected for the right side of five card view 600 at a selected respective depth parameter. Line plot 620 demonstrates a borehole end position at a depth parameter corresponding to the depth of the resistivity transmitter position. A dotted line 630 demonstrates the determined subterranean formation boundary being carried across the elements of five card view 600. Line plots 640 demonstrate calculated resistivity below the borehole depth parameter, e.g., below dotted line 630, using a determined distribution resistivity curve.

Figure 6B:
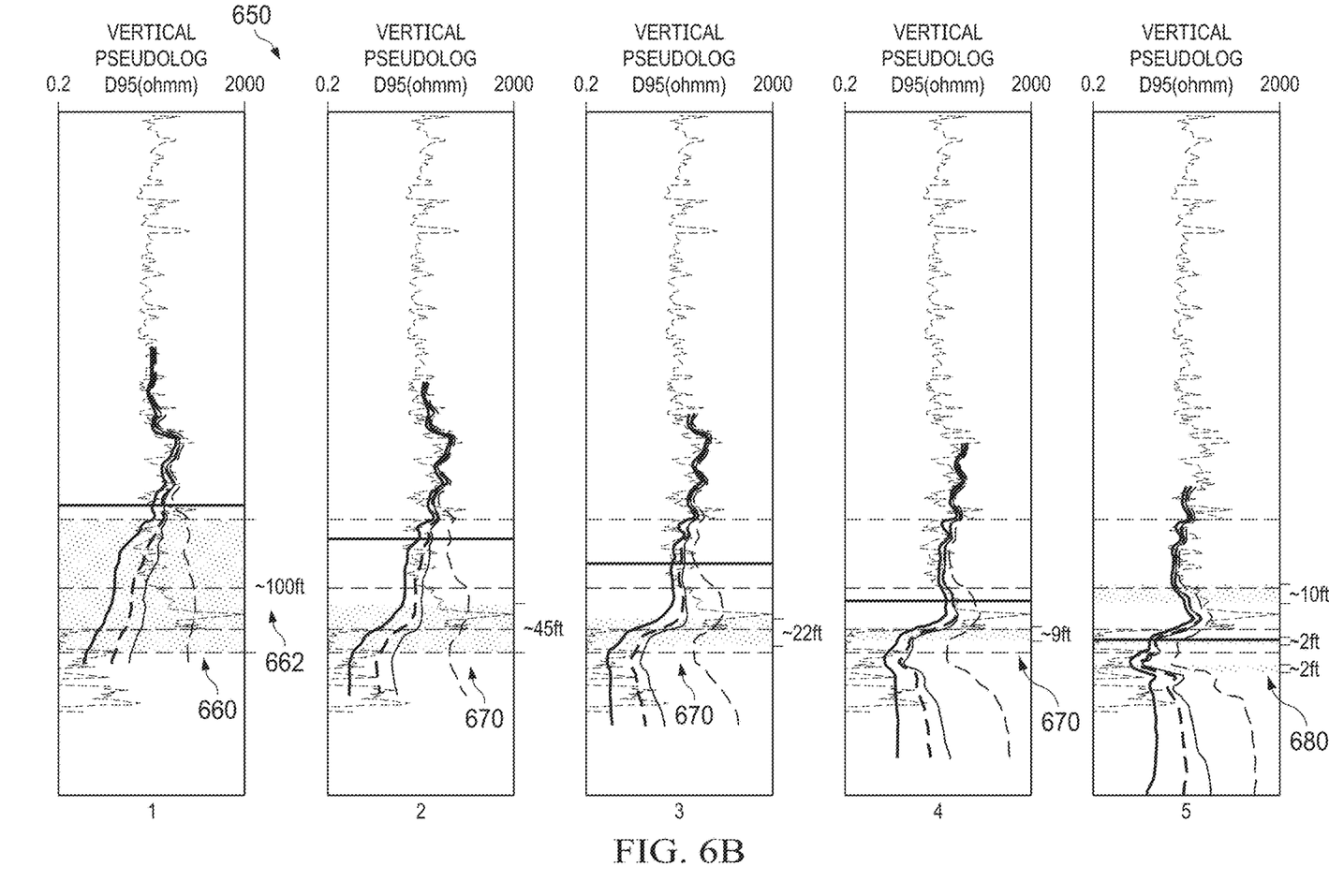
FIG. 6B is an illustration of a diagram of an example boundary uncertainty display, building on FIG. 6A.

FIG. 6B is an illustration of a diagram of an example boundary uncertainty display 650, building on FIG. 6A. A boundary window 660 is shown as a light colored box. Boundary window 660 can be computed using an analysis, e.g., interpretation, of the distribution resistivity curves for the selected slice of data. Boundary window 660 is an uncertainty window boundary with a range 662 showing the possible depth ranges (in this demonstration, a true vertical depth) for the boundary.

Each of the slices of data represent a slice of increasing depth. Boundary windows 670 demonstrate that as the resistivity transmitter approaches the boundary, the uncertainty of the boundary position decreases, e.g., the vertical depth range decreases. In some aspects, a card view 680 demonstrates that multiple boundary uncertainties can be displayed and resolved on one or more card views.

FIGS. 4, 5, 6A, and 6B demonstrate the processes described herein using a visual component. The visual component can be organized in various ways and orientations, using various colors, shapes, lines, and other geometric indicators. In some aspects, the visual component does not need to be generated as the processes can be implemented by a computing system where the underlying data used to generate the visual component can be utilized by the processes executing on the computing system.

Figure 7:
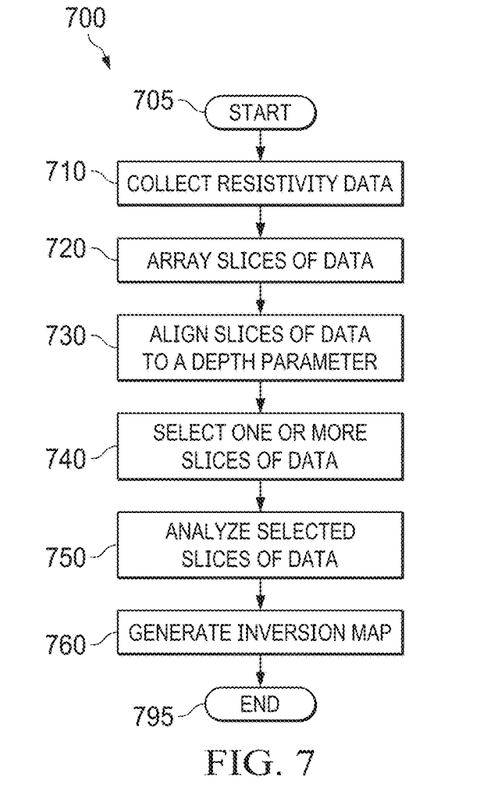
FIG. 7 is an illustration of a flow diagram of example method using multiple data views.

FIG. 7 is an illustration of a flow diagram of example method 700 using multiple data views to localize an object, such as a metal pipe or an adjacent borehole, or subterranean formation change, e.g., boundary, relative to an active borehole. Method 700 can be performed on a computing system, such as a well site controller, a geo-steering system, a BHA, or other computing system capable of receiving the collected component resistivity data, and capable of communicating with equipment or a user at a well site, for example, look ahead system 800 of FIG. 8. Other computing systems can be a smartphone, a mobile phone, a PDA, a laptop computer, a desktop computer, a server, a data center, a cloud environment, or other computing system. Method 700 can be encapsulated in software code or in hardware, for example, an application, a code library, a dynamic link library, a module, a function, a RAM, a ROM, and other software and hardware implementations. The software can be stored in a file, database, or other computing system storage mechanism. Method 700 can be partially implemented in software and partially in hardware.

Method 700 starts at a step 705 and proceeds to a step 710 where the resistivity data is collected. Various types of resistivity tools can be utilized, such as tools that utilize one or more resistivity transmitters, one or more resistivity receivers, and where the spacing of the resistivity transmitters and resistivity receivers can vary. The collected resistivity data can be communicated to a downhole tool, for example, a resistivity localizer, or communicated to an uphole tool, for example, a well site controller or other computing system.

In a step 720, the slices of data from the collected resistivity tool can be arrayed around a representation of the active borehole. In some aspects, a helix interleaved pattern, e.g., a non-overlapping pattern, corresponding to the depth of the central point of the data slice can be utilized. In some aspects, the slices of data can be arrayed using various patterns as long as the slices of data are non-overlapping and organized corresponding to their respective central point depths. In a step 730, the slices of data are aligned corresponding to the respective central point depth of each respective slice of data. The depth can be a true vertical depth, a true vertical depth sub-sea, or a measured depth. The depth can be represented using various measurement units, for example, meters or feet.

In a step 740, one or more slices of data can be selected for further analyzation. In some aspects, a card view can be displayed next to the slices of data view for each selected slice of data. The card view can display details of the collected resistivity data for the respective slice of data, and the displayed data can be oriented and scaled to align to the utilized depth parameter.

In a step 750, the resistivity data in each respective card view can be analyzed separately or together to estimate object location or subterranean formation boundaries in the look ahead area. In a step 760, the output from step 750 can be utilized to generate an inversion map of the subterranean formation around the borehole and in the look ahead area with respect to the borehole. The inversion map can be utilized by a user or computing system to determine subsequent drilling operations, for example, for intercept adjustments or avoidance adjustments. Method 700 ends at a step 795.

Figure 8:
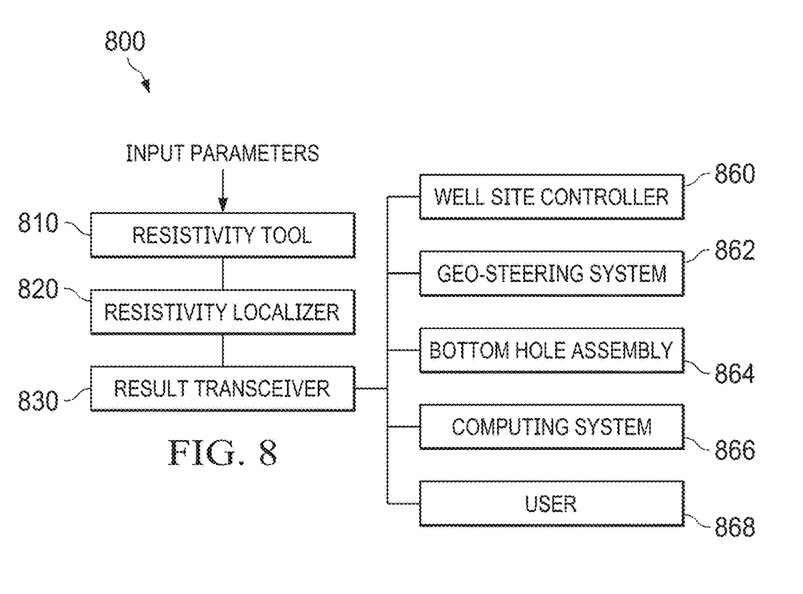
FIG. 8 is an illustration of a block diagram of an example look ahead system.

FIG. 8 is an illustration of a block diagram of an example look ahead system 800, which can be implemented using a resistivity tool and one or more computing systems, for example, a well site controller, a reservoir controller, a data center, a cloud environment, a server, a laptop, a smartphone, a mobile phone, a tablet, and other computing systems. The computing system can be located proximate the well site, or a distance from the well site, such as in a data center, cloud environment, or corporate location. The computing system can be a distributed system having a portion located proximate the well site and a portion located remotely from the well site.

Look ahead system 800, or a portion thereof, can be implemented as an application, a code library, a dynamic link library, a function, a module, other software implementation, or combinations thereof. In some aspects, look ahead system 800 can be implemented in hardware, such as a ROM, a graphics processing unit, or other hardware implementation. In some aspects, look ahead system 800 can be implemented partially as a software application and partially as a hardware implementation.

Look ahead system 800 includes a resistivity tool 810, a resistivity localizer 820, and a result transceiver 830. The borehole localization parameters and analyzed outputs from resistivity localizer 820 can be communicated to another system, such as one or more of a well site controller 860, a geo-steering system 862, a BHA 864, a computing system 866, or a user 868. In some aspects, the borehole localization data and analyzed outputs can be used to ensure the borehole is being drilled per the well site operation plan or is otherwise proceeding along the intended drilling path.

Resistivity tool 810 can receive input parameters to direct its operations. The input parameters can be parameters, energy levels, frequencies, instructions, directions, data, and other information to enable or direct the remaining processing of look ahead system 800. For example, the input parameters can include a time at which to perform the method and processes, an algorithm to utilize, a resistivity level, an energy level to utilize by the transmitter, one or more frequencies to output, an output system to receive the collected component resistivity data, the reconstructed resistivity data, a look ahead map of resistivity contrasts, the low resistivity data, distribution resistivity curve percentage parameter, depth parameter, a selected depth type (true vertical depth, true vertical depth sub-sea, and measured depth), a number of slices of data, and other input parameters.

Resistivity tool 810 can collect measurements from a portion of the surrounding subterranean formation around a borehole and a portion of the look ahead area, where the portion is proximate the location of the resistivity tool. The collected data, e.g., measurements, can be reconstructed into reconstructed resistivity data by resistivity localizer 820, or another computing system. In some aspects, resistivity localizer 820 can be part of resistivity tool 810, well site controller 860, geo-steering system 862, BHA 864, or computing system 866.

In some aspects, resistivity localizer 820 can extract low resistivity data utilizing a resistivity level parameter. In some aspects, resistivity localizer 820 can utilize the reconstructed resistivity data and the low resistivity data to generate a visual representation of the respective data. In some aspects, resistivity localizer 820 can allow a selection of slices of data and the display of a card view for each slice of data selected, where the slices of data can be arrayed in an interleaved and non-overlapping process, and where each slice of data is oriented using a corresponding depth parameter. In some aspects, resistivity localizer can analyze the slices of data and the details available in the selected card views. In some aspects, resistivity localizer can enable a user to perform the slice of data selection and analyzation.

Result transceiver 830 can communicate one or more generated outputs, collected component resistivity data, reconstructed resistivity data, and low resistivity data, boundary identification, subterranean formation characteristics, or object identification, to one or more other systems, such as geo-steering system 862, a geo-steering controller, well site controller 860, computing system 866, BHA 864, a drilling system, user 868, or other well related systems. For example, result transceiver 830 can communicate the various parameters and data to geo-steering system 862 or well site controller 860, where the drilling operation of the active borehole is then altered, utilizing the various parameters as inputs, to follow a new drilling path. Resistivity tool 810, resistivity localizer 820, and result transceiver 830 can be, or can include, conventional interfaces configured for transmitting and receiving data.

Resistivity localizer 820 can implement the analysis and algorithms as described herein utilizing the collected component resistivity data and the input parameters. Resistivity localizer 820 can use one or more algorithms, such as machine learning, decision tree, random forest, logistic regression, linear, and other algorithms to determine the borehole localization data.

A memory or data storage of resistivity localizer 820 can be configured to store the processes and algorithms for directing the operation of resistivity localizer 820. Resistivity localizer 820 can also include a processor that is configured to operate according to the analysis operations and algorithms disclosed herein, and an interface to communicate (transmit and receive) data.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the three aspects disclosed, the method, the system, and the computer program product, can have one or more of the following additional elements in combination. Element 1: generating an inversion map utilizing the analyzation output. Element 2: communicating the analyzation output to the borehole system. Element 3: adjusting an operation plan of the borehole system. Element 4: wherein the borehole system is a well site controller. Element 5: wherein the arraying utilizes an interleaved helix pattern and are non-overlapping. Element 6: wherein the central point depth is measured using one of a true vertical depth, a true vertical depth sub-sea, or a measured depth. Element 7: wherein the boundary is one or more of an object, adjacent borehole, metal pipe, or subterranean formation change. Element 8: a result transceiver, operable to receive an output from the resistivity localizer and communicate the output to a borehole system. Element 9: wherein the borehole system is one or more of a well site controller, a geo-steering system, a bottom hole assembly, a computing system, or a user. Element 10: wherein the resistivity localizer is located proximate the resistivity tool. Element 11: a computing system is utilized to generate boundary data using the resistivity data. Element 12: wherein the resistivity localizer is located at a surface location and a user selects one or more slices of data for the one or more card views. Element 13: wherein the resistivity localizer is further capable to align the slices of data corresponding to a central point depth parameter for each of the slices of data. Element 14: wherein the resistivity localizer is further capable of generating an inversion map representing a portion of a subterranean formation in a look ahead area of the borehole.

What is claimed is:

1. A method, comprising:
   collecting, by a resistivity localizer, a set of resistivity data from a resistivity tool located downhole of a borehole located at a well site, where the resistivity tool is directed by a borehole system;
   arranging, around a representation of the borehole utilizing a non-overlapping pattern, at least two longitudinal slices of data from the set of resistivity data, wherein each longitudinal slice of data in the set of resistivity data represents one measurement as collected by the resistivity tool, where at least one longitudinal slice of data from the at least two longitudinal slices of data extends into a look ahead area, and the look ahead area is an area ahead of the resistivity tool as the resistivity tool is moved through the borehole;
   aligning each longitudinal slice of data in the set of resistivity data to the borehole utilizing a corresponding central point depth of each respective longitudinal slice of data;
   selecting a set of card views from a subset of longitudinal slices of data from the set of resistivity data;
   using a look ahead display wherein each longitudinal slice of data in the subset of longitudinal slices of data is displayed using a side-by-side card view, derived from the set of card views, oriented in a vertical track, and one or more indicator lines are displayed across the side-by-side card view; and
   localizing, using the resistivity localizer, an object in the look ahead area relative to the resistivity tool by analyzing a distribution resistivity curve of resistivity data corresponding to each longitudinal slice of data in the subset of longitudinal slices of data and generating an analyzation output, wherein the analyzation output includes a localization of the object and the distribution resistivity curve, which is used to perform a drilling operation.

2. The method as recited in claim 1, further comprising: generating an inversion map utilizing the analyzation output, and the inversion map is used as an input to the operation plan.

3. The method as recited in claim 1, further comprising: communicating the analyzation output to the borehole system.

4. The method as recited in claim 1, further comprising: adjusting an operation plan of the borehole system utilizing the analyzation output.

5. The method as recited in claim 1, wherein the borehole system is one of a surface controller or a downhole controller, wherein the surface controller is a well site controller or a computing system, or the downhole controller is a bottom hole assembly (BHA) or a geo-steering controller.

6. The method as recited in claim 1, wherein the non-overlapping pattern utilizes an interleaved helix pattern.

7. The method as recited in claim 1, wherein the central point depth of each respective longitudinal slice of data is measured using one of a true vertical depth, a true vertical depth sub-sea, or a measured depth.

8. The method as recited in claim 1, wherein the object is one or more of an adjacent borehole, a metal pipe, or a subterranean formation change.

9. A system, comprising:
   a resistivity tool, capable to collect a set of resistivity data, wherein the resistivity tool is located downhole a borehole of a well site, the set of resistivity data includes at least two longitudinal slices of data, and at least one longitudinal slice of data from the at least two longitudinal slices of data extends into a look ahead area, where the look ahead area is an area ahead of a direction of movement of the resistivity tool;
   a processor, capable of aligning each longitudinal slice of data in the set of resistivity data to the borehole utilizing a corresponding central point depth of each respective longitudinal slice of data, selecting a set of card views from a subset of longitudinal slices of data from the set of resistivity data, and using a look ahead display wherein each longitudinal slice of data in the subset of longitudinal slices of data is displayed using a side-by-side card view, derived from the set of card views, oriented in a vertical track, and one or more indicator lines are displayed across the side-by-side card view;
   a resistivity localizer, capable of generating an analyzation output including localizing an object in a look ahead area using a distribution resistivity curve of the one or more subsets of longitudinal slices of data, wherein each longitudinal slice of data in the one or more subsets of longitudinal slices of data represents one measurement as collected by the resistivity tool, and wherein the resistivity localizer is directed by one of a surface controller or a downhole controller; and
   a drilling system, capable of performing a drilling operation utilizing the analyzation output.

10. The system as recited in claim 9, further comprising: a result transceiver, operable to receive an output from the resistivity localizer and communicate the output to a borehole system, a well site controller, a geo-steering system, or a user system.

11. The system as recited in claim 10, wherein the surface controller is the well site controller or a computing system, or the downhole controller is a bottom hole assembly (BHA) or a geo-steering controller.

12. The system as recited in claim 9, wherein the resistivity localizer is located proximate the resistivity tool and a computing system is utilized to generate boundary data using the resistivity data.

13. The system as recited in claim 9, wherein the resistivity localizer is located at a surface location and a user input directs the parsing the set of resistivity data used to produce the one or more card views.

14. The system as recited in claim 9, wherein the resistivity localizer is further capable to align each longitudinal slice of data in the set of resistivity data to the borehole utilizing a corresponding central point depth parameter of each longitudinal slice of data.

15. The system as recited in claim 9, wherein the resistivity localizer is further capable of generating an inversion map representing a portion of a subterranean formation in the look ahead area of the borehole.

16. A computer program product having a series of operating instructions stored on a non-transitory computer-readable medium that directs a data processing apparatus when executed thereby to perform operations to determine look ahead inversion mapping from a set of resistivity data, the operations comprising:
   receiving, by a resistivity localizer, the set of resistivity data from a resistivity tool located downhole of a borehole located at a well site, where the resistivity tool is directed by a borehole system;

arranging, around a representation of the borehole utilizing a non-overlapping pattern, at least two longitudinal slices of data from the set of resistivity data, wherein each longitudinal slice of data in the set of resistivity data represents one measurement as collected by the resistivity tool, where at least one longitudinal slice of data from the at least two longitudinal slices of data extends into a look ahead area, and the look ahead area is an area ahead of the resistivity tool as the resistivity tool is moved through the borehole;

aligning each longitudinal slice of data in the set of resistivity data to the borehole utilizing a corresponding central point depth of each respective longitudinal slice of data;

selecting a set of card views from a subset of longitudinal slices of data from the set of resistivity data;

using a look ahead display wherein each longitudinal slice of data in the subset of longitudinal slices of data is displayed using a side-by-side card view, derived from the set of card views, oriented in a vertical track, and one or more indicator lines are displayed across the side-by-side card view; and localizing, using the resistivity localizer, an object in the look ahead area relative to the resistivity tool by analyzing a distribution resistivity curve of resistivity data corresponding to each longitudinal slice of data in the subset of longitudinal slices of data and generating an analyzation output, wherein the analyzation output includes a localization of the object and the distribution resistivity curve, which is used to perform a drilling operation.

17. The computer program product as recited in claim 16, further comprising: generating an inversion map utilizing the analyzation output, and the inversion map is used as an input to the operation plan.

18. The computer program product as recited in claim 16, further comprising: communicating the analyzation output to the borehole system.

19. The computer program product as recited in claim 16, further comprising: adjusting an operation plan of the borehole system utilizing the analyzation output.

20. The computer program product as recited in claim 16, wherein the non-overlapping pattern utilizes an interleaved helix pattern.

* * * * *